(12) United States Patent
Tanaka et al.

(10) Patent No.: US 6,915,380 B2
(45) Date of Patent: Jul. 5, 2005

(54) DISK STORAGE SYSTEM HAVING DISK ARRAYS CONNECTED WITH DISK ADAPTORS THROUGH SWITCHES

(75) Inventors: Katsuya Tanaka, Kokubunji (JP); Kazuhisa Fujimoto, Kokubunji (JP)

(73) Assignee: Hitachi, Ltd, Tokyo (JP)

( * ) Notice: Subject to any disclaimer, the term of this patent is extended or adjusted under 35 U.S.C. 154(b) by 315 days.

(21) Appl. No.: 10/212,882

(22) Filed: Aug. 7, 2002

(65) Prior Publication Data

US 2003/0191891 A1 Oct. 9, 2003

(30) Foreign Application Priority Data

Apr. 9, 2002 (JP) .................................... P2002-106262

(51) Int. Cl.⁷ ............................................. G06F 12/00
(52) U.S. Cl. ...................... 711/114; 711/113; 711/149; 711/151; 711/167; 710/6; 710/37; 710/38; 710/52; 710/316; 713/501; 713/502
(58) Field of Search .......................... 711/111, 112, 113, 711/114, 149, 151, 167; 713/501, 502; 710/6, 37, 38, 52, 316; 709/213, 243

(56) References Cited

U.S. PATENT DOCUMENTS 6,112,276 A * 8/2000 Hunt et al. ................. 711/112
6,542,954 B1 * 4/2003 Aruga ........................ 710/316
RE38,134 E * 6/2003 Ross et al. .................. 710/20
6,633,946 B1 * 10/2003 Hendel ....................... 710/317
2002/0023195 A1 * 2/2002 Okada ........................ 711/114
2003/0046460 A1 * 3/2003 Inoue et al. ................. 710/38

FOREIGN PATENT DOCUMENTS

| JP | 5-173722 | 5/1992 |
| JP | 6-19627 | 6/1992 |
| JP | 11-296313 | 4/1998 |

* cited by examiner

Primary Examiner—Chirstian P. Chace
(74) Attorney, Agent, or Firm—Reed Smith LLP; Stanley P. Fisher, Esq.; Juan Carlos A. Marquez, Esq.

(57) ABSTRACT

A disk storage system has high throughput between a disk adapter of a disk controller and a disk array. The disk adapter of the disk controller is connected to the disk array through switches. Data on a channel between the switch and a RAID group is multiplexed in the switch to be transferred onto a channel between the switch and the disk adapter and data on the channel between the switch and the disk adapter is demultiplexed in the switch to be transferred onto the channel between the switch and the RAID group. A data transfer rate on the channel between the disk adapter and the switch is made higher than that on the channel.

21 Claims, 11 Drawing Sheets

DISK STORAGE SYSTEM HAVING DISK ARRAYS CONNECTED WITH DISK ADAPTORS THROUGH SWITCHES

BACKGROUND OF THE INVENTION

The present invention relates to a secondary storage apparatus in a computer system and more particularly to a disk storage system having high input/output data transfer performance.

In a current computer system, data required by a CPU (Central Processing Unit) are stored in a secondary storage apparatus and data are written in and read out from the secondary storage apparatus when the CPU or the like requires the data.

As the secondary storage apparatus, a non-volatile memory medium is generally used and as its representative, there is a disk storage system such as a magnetic disk apparatus and an optical disk.

With the high advancement of the information-oriented society in recent years, high-performance of the secondary storage apparatus of this kind is required in the computer system.

FIG. 9 is a block diagram schematically illustrating a conventional disk storage system.

In FIG. 9, the disk storage system includes a disk controller DKC and a disk array DA.

The disk controller DKC includes a channel adapter CHA for connecting the disk storage system to a higher-rank CPU (not shown), a cache memory CM for temporarily storing data written in and read out from the disk array DA and a disk adapter DKA for connecting the disk controller DKC to the disk array DA.

The channel adapter CHA, the cache memory CM and the disk adapter DKA are connected through a bus or switch.

The channel adapter CHA includes four channels C1, C2, C3 and C4 connected to the CPU.

The disk adapter DKA is connected to the disk array through four channels D1, D2, D3 and D4.

The disk array DA includes disk groups R1, R2, R3 and R4.

When the RAID system is constructed in the disk array DA, the disk groups R1, R2, R3 and R4 each constitute RAID groups.

Write data inputted from the channels C1, C2, C3 and C4 are stored in the cache memory CM and at the same time the write data are divided into data of block-size unit, so that the data divided in the block unit are sent through three channels of the channels D1, D2, D3 and D4 and a parity calculated from the divided data is sent through a remaining channel from the disk adapter DKA to the disk array DA.

When data is read out, it is first examined whether the data is present or stored in the cache memory CM.

When the data is present in the cache memory CM, the data is read out through the channel adapter CHA from the cache memory CM and transmitted through the channel adapter CHA to the CPU.

When the data is not present in the cache memory CM, the disk adapter DKA reads out the data divided in the block unit from the disk array DA through the channels D1, D2, D3 and D4 and transmits the read data through the channel adapter CHA to the CPU. The conventional technique of this kind is named the first conventional technique.

The disk storage system related to the first conventional technique is described in, for example, "MAIN FRAME in Separate Volume of Nikkei Computer '98", pp. 144 to 153 issued by Nikkei BP Co. (1998).

A disk storage system having a disk array connected to a disk adapter through switches is disclosed in JP-A-5-173722 entitled "Exchange Device of Multi-Channel Data and Parity".

The conventional technique described in the above publication is hereinafter named the second conventional technique.

According to the second conventional technique, the number of buses related to the disk array and the number of buses related to the disk adapter can be set up independently.

A disk storage system having a disk array connected to a disk adapter through a buffer control block is disclosed in JP-A-6-19627 entitled "Rotation Type Storage Apparatus".

The conventional technique described in the above publication is hereinafter named the third conventional technique.

According to the third conventional technique, a data transfer rate between the disk adapter and the disk array can be set up to any value and influence due to a waiting time caused by rotation of the disk can be reduced.

The date transfer rate per channel is increased year after year with the progress of network technique.

For example, the data transfer rate per channel in a fiber channel used in a disk storage system is 1 to 2 Gbps at present but is planned to be increased to 4 to 10 Gbps in the near future.

It is forecasted that the throughput between the CPU and the channel adapter (hereinafter named the front-end) complies with the above increased data transfer rate.

However, it is forecasted that the throughput between the disk adapter and the disk array (hereinafter named the back-end) is not increased as the front-end due to the following reasons.

The first reason is that the disk drive contains mechanical components and accordingly the high-speed operation is difficult as compared with the front-end including only electronic and optical elements as elements influencing the high-speed operation.

The second reason is that the cost of the disk storage system having a large number of disk drives is increased when high-speed interfaces are mounted for all of the disk drives even if operation of the disk drives is made fast.

The first conventional technique has a problem that the performance of the disk storage system is not improved due to detachment of the throughputs of the front-end and the back-end even if the data transfer rate per channel of the channel adapter is improved.

Further, it is considered that a large number of low-speed ports are provided in the disk adapter in order to improve the throughput of the back-end, although the increased ports in the disk adapter complicates control.

In the second conventional technique, switches can be provided between the disk adapter and the disk array to thereby increase the number of ports for increased disks, although there is a problem that the data transfer rate per channel is limited to that of the disk array and accordingly the throughput between the disk adapter and the disk array becomes the neck of performance.

The third conventional technique is a technique capable of reducing influence due to the waiting time caused by rotation of the disk but has a problem that detachment between the front-end and the back-end cannot be reduced.

SUMMARY OF THE INVENTION

It is an object of the present invention to provide a disk storage system having high throughput between a disk adapter and a disk array.

It is another object of the present invention to provide a disk storage system having high throughput between a disk adapter and a disk array and the increased number of disk drives connected thereto.

It is still another object of the present invention to provide a disk storage system having a highly reliable disk array.

It is still another object of the present invention to provide a disk storage system having a highly reliable network between a disk adapter and a disk array.

It is still another object of the present invention to provide a disk storage system having a network with high reliability and high throughput between a disk adapter and a disk array.

It is still another object of the present invention to provide a disk storage system capable of performing reading operation from and writing operation in a disk with high throughput.

It is still another object of the present invention to provide a disk storage system capable of keeping high throughput.

It is still another object of the present invention to provide an inexpensive disk storage system having high throughput.

In order to achieve the above objects, the disk storage system according to the present invention includes a disk controller and a disk array and the disk controller includes a channel adapter, a cache memory and a disk adapter.

The disk adapter is connected to the disk array through a switch having a buffer memory and the data transfer rate per channel between the disk adapter and the switch is set to be higher than that between the switch and the disk array.

The switch changes over connection between ports connected to which the disk adapter is connected and ports to which disk drives constituting the disk array are connected in accordance with destination information in a frame for each of inputted frames.

Further, the disk array includes a plurality of disk drives connected into a loop and the disk adapter is connected to the plurality of disk arrays through switches having buffer memories. The data transfer rate per channel between the disk adapter and the switch is set to be higher than that between the switch and the plurality of disk arrays and the switch changes over connection between ports to which the disk adapter is connected and ports to which the plurality of disk arrays are connected in accordance with destination information in a frame for each of inputted frames.

Moreover, the disk adapter is connected to the disk array through switches having buffer memories and a combination of disk drives connected to the same switch constitutes a RAID group. The data transfer rate per channel between the disk adapter and the switch is set to be higher than that between the switch and the disk array and the switch changes over connection between ports to which the disk adapter is connected and ports to which the disk drives constituting the RAID group are connected in accordance with destination information in a frame for each of inputted frames.

Furthermore, the disk storage system includes first and second disk controllers and a plurality of disk arrays. The first disk controller includes a first channel adapter, a first cache memory and a first disk adapter and the second disk controller includes a second channel adapter, a second cache memory and a second disk adapter.

The first disk adapter is connected to the plurality of disk arrays through a first switch having a buffer memory and the second disk adapter is connected to the plurality of disk arrays through a second switch having a buffer memory. Further, the first switch is connected to the second disk adapter and the second switch is connected to the first disk adapter.

The data transfer rate per channel between the second disk adapter and the second switch and between the first disk adapter and the second switch is set to be higher than that between the second switch and the plurality of disk arrays.

The first switch changes over connection between ports to which the first or second disk adapter is connected and ports to which the plurality of disk arrays are connected in accordance with destination information in a frame for each of inputted frames and the second switch changes over connection between ports to which the first or second disk adapter is connected and ports to which the plurality of disk arrays are connected in accordance with destination information in a frame for each of inputted frames.

Moreover, the first switch is connected to the second switch through a channel having the same data transfer rate as the channel connected between the first disk adapter and the second switch and a channel having the same data transfer rate as the channel connected between the second disk adapter and the first switch.

Further, when data is read out from the disk array, data transferred from the disk array to the switch is multiplexed in the switch to be transferred to the disk adapter and when data is written in the disk array, data transferred from the disk adapter to the switch is demultiplexed in the switch to be transferred to the disk array.

Furthermore, when data is written from the disk adapter into the disk array, the disk adapter sets destination information in a frame to be transmitted so that connection between the ports is changed over and when data is read out from the disk array to the disk adapter, the switch changes over connection between ports by the round robin method.

Further, the number of ports to be changed over is set to be substantially equal to the ratio of the data transfer rate per channel between the disk adapter and the switch to that between the switch and the disk array.

In addition, the disk adapter is connected to the switch through optical fiber cable and the switch is connected to the disk array through metal cable.

DESCRIPTION OF THE EMBODIMENTS

Embodiments of the present invention are now described in detail with reference to the accompanying drawings.

Figure 1:
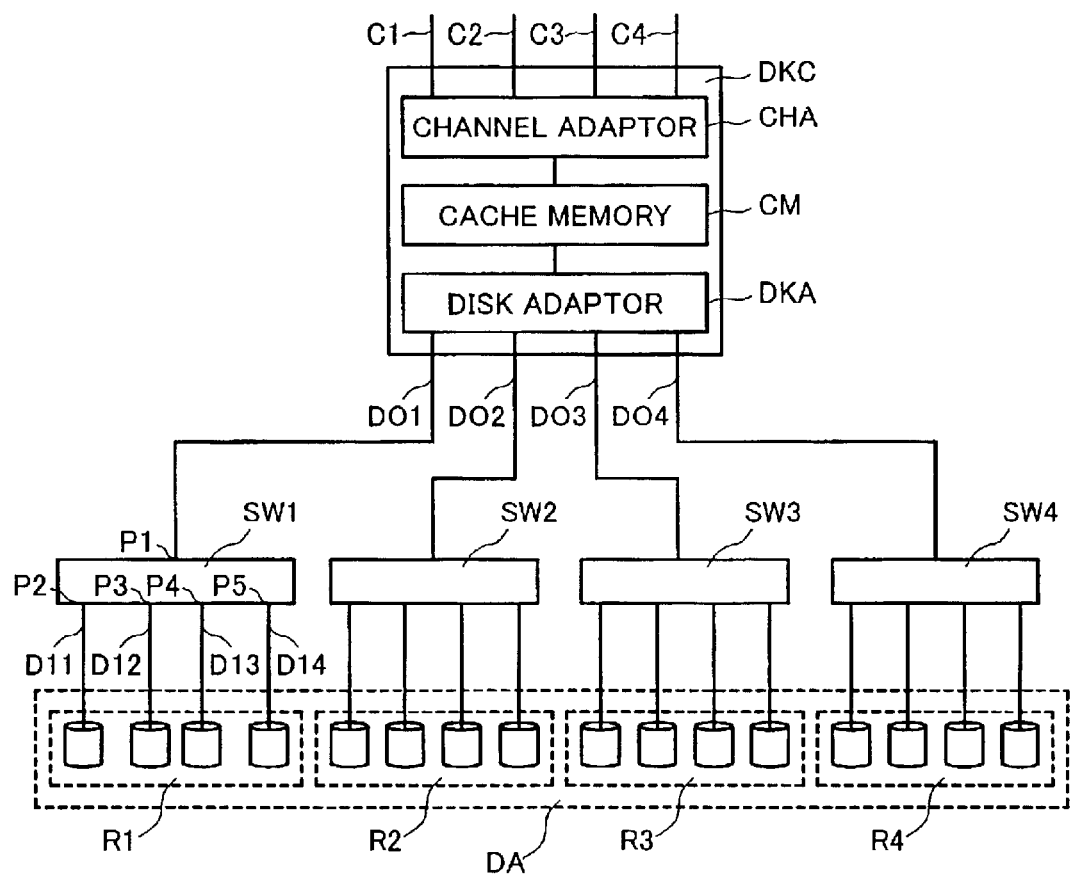
FIG. 1 schematically illustrates a disk storage system according to a first embodiment of the present invention.

FIG. 1 schematically illustrates a disk storage system according to a first embodiment of the present invention.

The disk storage system of the embodiment includes a disk controller DKC and a disk array DA.

The disk controller DKC includes a channel adapter CHA, a cache memory CM and a disk adapter DKA.

The channel adapter CHA performs control required when data is transmitted and received between a higher-rank CPU (not shown) and the disk controller DKC.

C1, C2, C3 and C4 represent channels used when the channel adapter CHA communicates with the CPU.

The cache memory CM is a memory for temporarily storing data inputted/outputted by the disk storage system of the embodiment.

The disk adapter DKA performs control required when data is transmitted and received between the disk controller DKC and the disk array DA.

The disk adapter DKA is connected to the disk array DA through channels D01, D02, D03 and D04.

The disk adapter DKA and the disk array DA can perform the full-duplex operation through the channels D01, D02, D03 and D04.

In the disk storage system of the embodiment, the disk adapter DKA and the disk array DA are connected through switches SW1, SW2, SW3 and SW4.

The disk array DA is composed of disk groups R1, R2, R3 and R4.

The disk group R1 is connected to the disk adapter DKA through the switch SW1.

Similarly, the disk groups R2, R3 and R4 are connected to the disk adapter DKA through the switches SW2, SW3 and SW4, respectively.

In the disk storage system of the embodiment, when the RAID system is constructed, the disk groups R1, R2, R3 and R4 are each the RAID group.

In the embodiment, the RAID group is constituted by four disk drives but the number of disk drives constituting the RAID group is not limited to four.

The flow of data in reading and writing of data to each disk group is now described by taking the disk group R1 as an example. R1 is the RAID group of RAID level 5.

Data transmitted from the CPU through the channels C1, C2, C3 and C4 in order to be written in the disk group R1 is divided into data of block unit in the disk adapter DKA and at the same time a parity is produced from the data divided into the block unit.

The data divided into the block unit and the parity are supplied through the channel D01 to the switch SW1.

The switch SW1 performs routing of the data divided into the block unit and the parity in accordance with the RAID control to be distributed to the channels D11, D12, D13 and D14.

In reading of data, the disk adapter DKA reads out data divided into the block unit from the disk group R1 through the channels D11, D12, D13 and D14 and converts the data into serial data in the switch SW1 to receive the read-out data through the channel D01.

Figure 9:
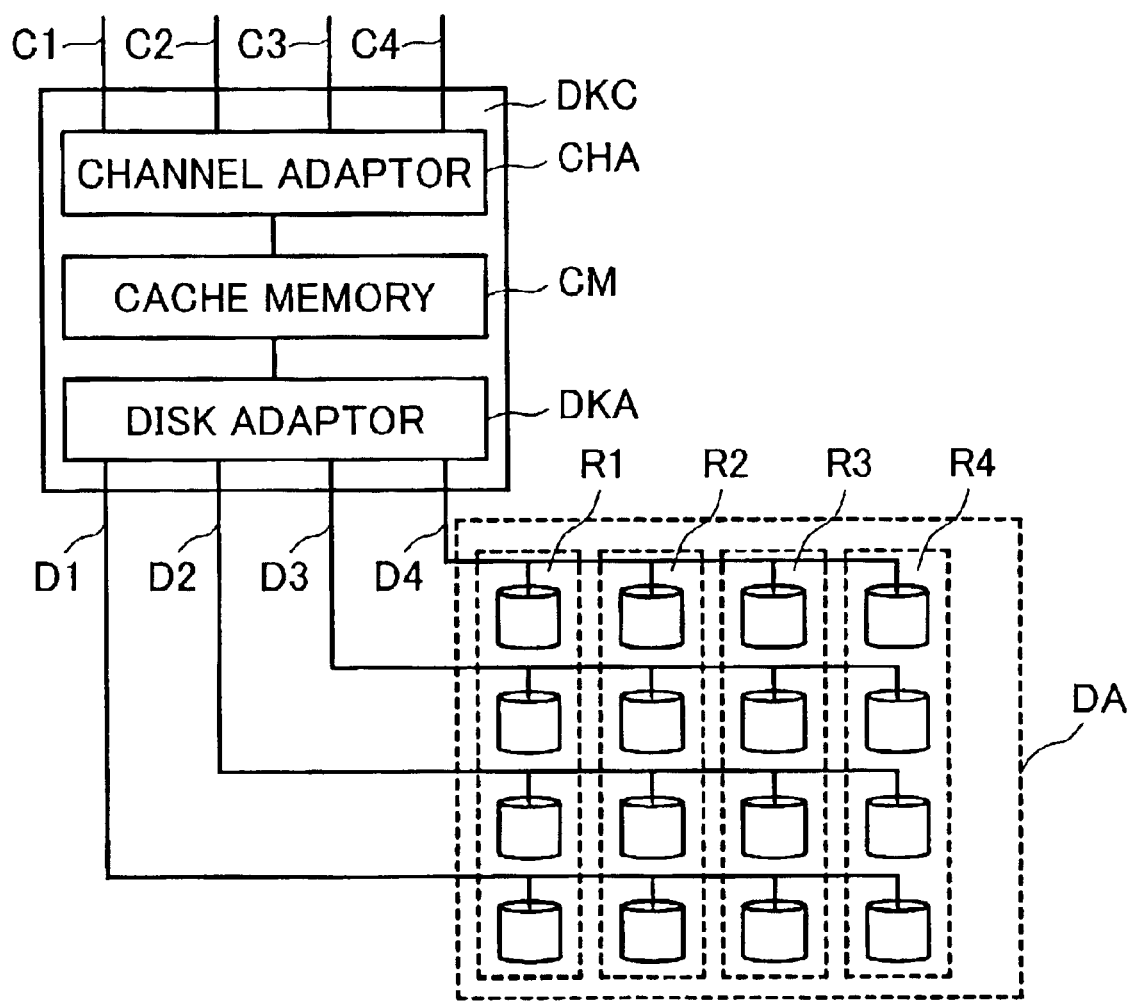
FIG. 9 schematically illustrates a conventional disk storage system.

In the conventional disk storage system shown in FIG. 9, data and a parity thereof to be written in the disk array are already distributed on separate channels D1, D2, D3 and D4 connected to the disk adapter DKA.

On the contrary, the disk storage system of the embodiment is different from the conventional system in that the data and the parity are distributed on separate channels after the passage of the switch SW1.

Operation of the switch characterized in the disk storage system of the embodiment is next described by taking the switch SW1 as an example. Operation of the switches SW2 to SW4 is also the same as that of the switch SW1.

As shown in FIG. 1, the switch SW1 includes input/output ports P1, P2, P3, P4 and P5.

The ports P1, P2, P3, P4 and P5 are input/output ports in which the full-duplex operation can be made and each include a buffer memory.

Figure 2:
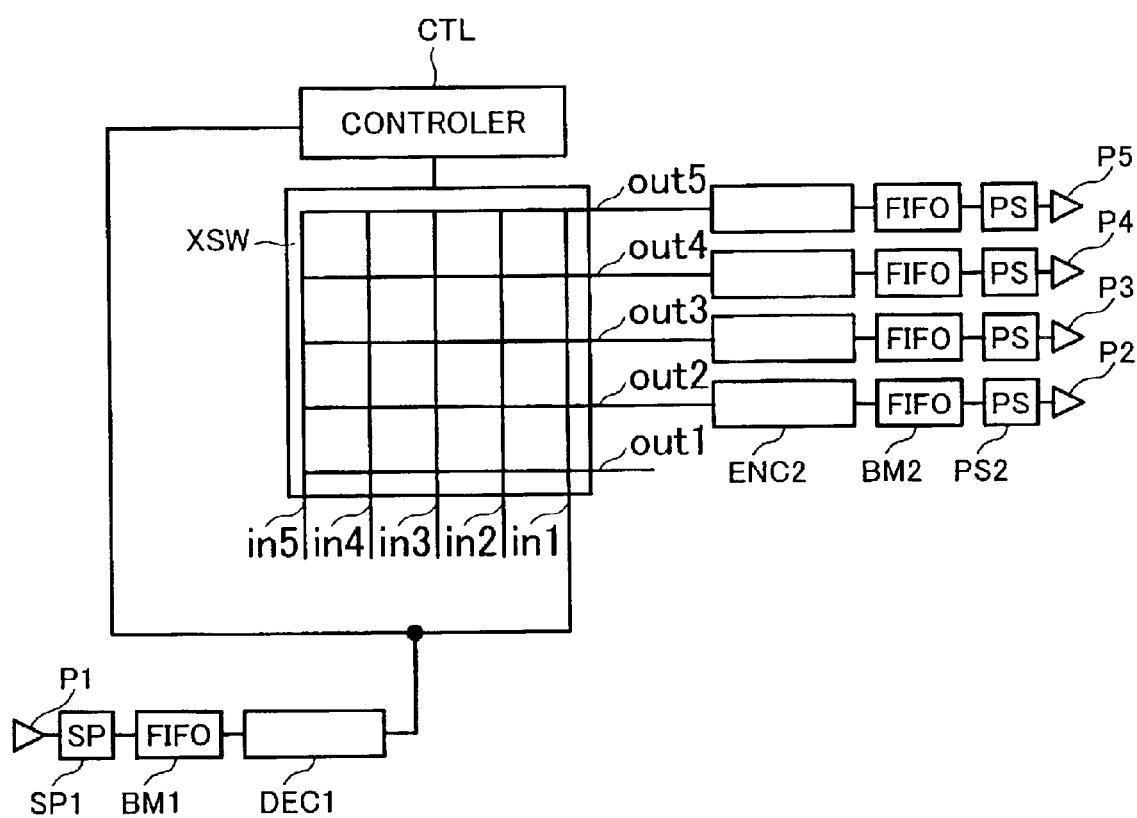
FIG. 2 illustrates the configuration of a switch used in the present invention.
Figure 3:
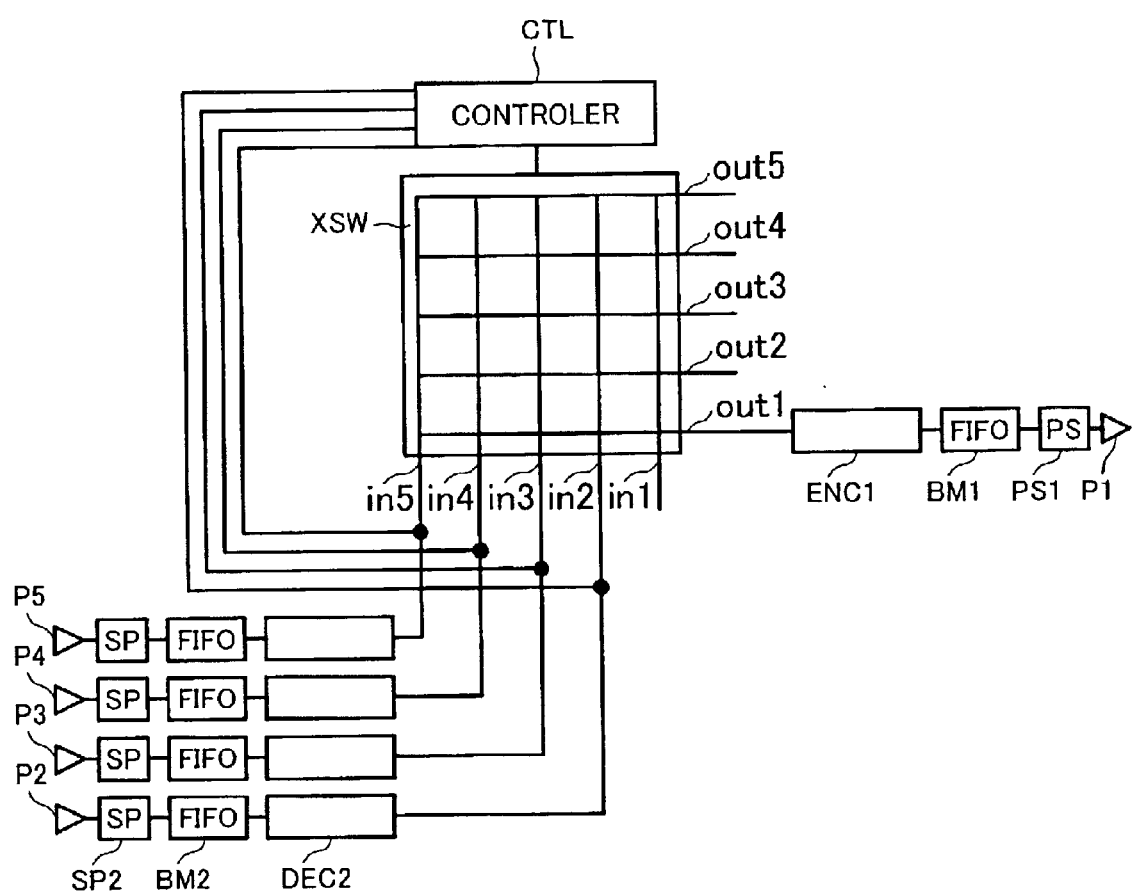
FIG. 3 illustrates the configuration of a switch used in the present invention.

The internal configuration of the switch SW1 is shown in FIGS. 2 and 3.

For simplification, description is made in accordance with switching operation divided in the flowing direction of data.

Further, data flowing on the channels D01, D11, D12, D13 and D14 are transmitted and received in frame unit and encoded in accordance with the 8B10B encoding scheme.

FIG. 2 illustrates the circuit configuration in which the frame in a block is inputted from the port P1 and outputted from the ports P2, P3, P4 and P5.

This operation corresponds to switching operation in writing of data in the disk array.

As shown in FIG. 2, the switch SW1 includes a crossbar switch XSW and a switch controller CTL.

The crossbar switch XSW is of 5×5 and includes input ports in1, in2, in3, in4 and in5 and output ports out1, out2, out3, out4 and out5.

The frame inputted from the port P1 is supplied through a serial-to-parallel converter SP1, a buffer memory BM1 and an 8B10B decoder DEC1 to the switch controller CTL and the input port in1.

The switch controller CTL decodes a destination address written in a header portion of the input frame and changes over the crossbar switch XSW.

By way of example, when the port P2 is selected as the output port, the inputted frame passes through the output port out2, an 8B10B encoder ENC2, a buffer memory BM2 and a parallel-to-serial converter PS2 and is outputted from the port P2.

The buffer memories BM1 and BM2 are FIFO (First-In First-Out) memories.

The serial-to-parallel converter SP1 converts the 8B10B-encoded serial data into parallel data of 10-bit width and writes the parallel data into the buffer memory BM1 in synchronism with the data transfer rate equal to one tenth of that at the port P1.

The 8B10B decoder DEC1 reads out the 10-bit parallel data from the buffer memory BM1 in synchronism with the operation speed of the crossbar switch XSW and subjects the 10-bit parallel data to 8B10B decoding to convert it into 8-bit parallel data.

The 8B10B encoder ENC2 encodes the 8-bit parallel data switched by the crossbar switch XSW into 8B10B-encoded data again to convert it into 10-bit parallel data and writes the data into the buffer memory BM2 in synchronism with the operation speed of the crossbar switch XSW.

The parallel-to-serial converter PS2 reads out the 10-bit parallel data from the buffer memory BM2 in synchronism with the data transfer rate equal to one tenth of that at the port P2 and converts the data into serial data to be outputted from the port P2.

Thus, the switch SW1 converts the data transfer rate at the port P1 into that at the port P2.

Figure 4:
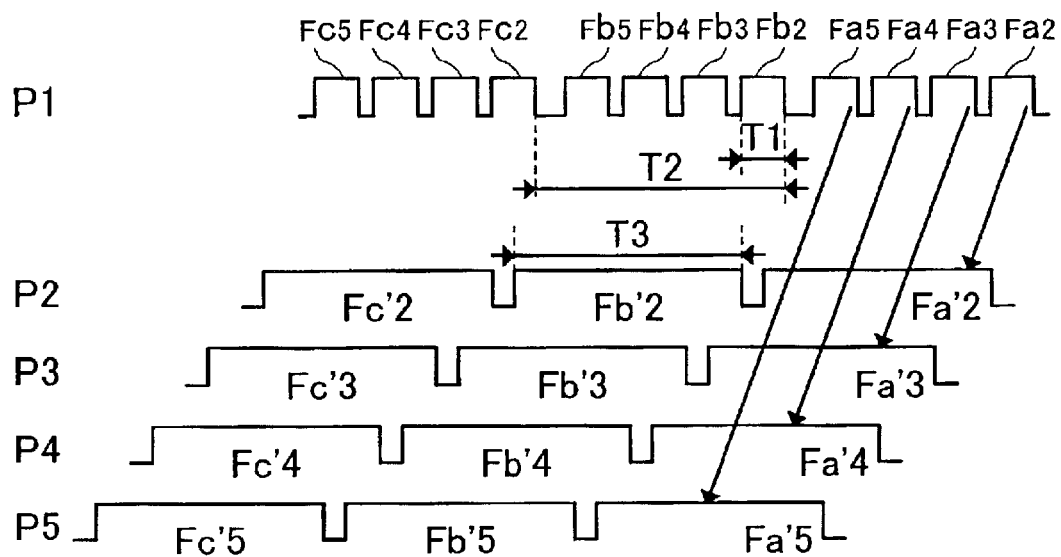
FIG. 4 is a diagram illustrating operation of the switch used in the present invention.

FIG. 4 is a diagram showing waveforms of the frame inputted to the port P1 and the frame outputted from the ports P2, P3, P4 and P5.

The high level of the waveforms represents the time that the frame is present and the low level thereof represents the time that the frame is not present.

The frame has the frame length changing in accordance with the capacity of data to be transmitted, while in this example the sequential access to the disk array is made and the frame length is fixed.

In FIG. 4, the data transfer rate at the input port P1 is m times of that at the output ports P2, P3, P4 and P5.

Accordingly, the duration T1 for the frame Fb2 at the port P1 is extended to the duration T3 upon outputted from the port P2.

Thus, $T3 = m \times T1$.

When the data transfer rate for input is high and the data transfer rate for output is low, the buffer memory at the output port is overflowed unless the switch is changed over periodically, so that the throughput is reduced.

In order that the frame passes through the switch without reduction of the throughput, it is necessary to change over the output port periodically as shown in FIG. 4.

When the number of ports to be changed over is n, the changing-over period of switch is $T2 \cong n \times T1$ (the time having no frame is neglected).

When $T2 \geq T3$, the frames do not collide and the throughput is not reduced.

$T2 \geq T3$ is the same as $n \geq m$.

In other words, the condition that the throughput is not reduced in the switch upon writing of data to the disk array is to set the number n of ports of the switch to be changed over periodically to be equal to or smaller than a ratio m of the data transfer rate per channel between the disk adapter and the switch to that between the switch and the disk array.

When this condition is satisfied, data inputted from the port P1 is subjected to rate conversion in the buffer memory and changed over in frame unit periodically to thereby be demultiplexed by means of the switch, so that the demultiplexed data are distributed into the ports P2, P3, P4 and P5 to be outputted.

One of methods of changing over the switch periodically is to make the disk group connected to the switch to be the RAID group.

The switch is changed over periodically in accordance with the striping control of the RAID.

FIG. 3 schematically illustrates the circuit configuration in which the frame is inputted from the ports P2, P3, P4 and P5 and outputted from the port P1.

This operation corresponds to switching operation in reading of data from the disk array.

For example, the frame inputted from the port P2 is supplied through a serial-to-parallel converter SP2, a buffer memory BM2 and an 8B10B decoder DEC2 to the switch controller CTL and the input port in2.

The switch controller CTL decodes a destination address written in a header portion of the input frame and changes over the crossbar switch XSW.

In the case of FIG. 3, data inputted from the ports P2, P3, P4 and P5 successively while changing over the crossbar switch XSW in accordance with the round robin method are all outputted to the port P1. That is, the frames are supplied to the plurality of input ports (P2, P3, P4 and P5) simultaneously in the reading operation. The plurality of input frames are not required to be supplied to the input ports in synchronism with one another. The switch changes over connection between input and output ports in the round robin manner to thereby transfer the plurality of input frames to the output port (P1) frame by frame. With the round robin method, the switch is changed over periodically. Further, even in the reading operation, the switch must be changed over in accordance with destination information in the frame.

The frame passes through the output port out1, an 8B10B encoder ENC1, the buffer memory BM1 and a parallel-to-serial converter PS1 and is outputted from the port P1.

The serial-to-parallel converter SP2 converts the 8B10B-encoded serial data into parallel data of 10-bit width and writes it in the buffer memory BM2 in synchronism with the data transfer rate equal to one tenth of that at the port P2.

The 8B10B decoder DEC2 reads out the 10-bit parallel data from the buffer memory BM2 in synchronism with the operation speed of the crossbar switch XSW and subjects the 10-bit parallel data to 8B10B decoding to convert it into 8-bit parallel data.

The 8B10B encoder ENC1 encodes the 8-bit parallel data switched by the crossbar XSW into 8B10B-encoded data again to convert it into 10-bit parallel data and writes it into the buffer memory BM1 in synchronism with the operation speed of the crossbar switch XSW.

The parallel-to-serial converter PS1 reads out the 10-bit parallel data from the buffer memory BM1 in synchronism with the data transfer rate equal to one tenth of that at the port P1 and converts the 10-bit parallel data into serial data to be outputted from the port P1.

Thus, the switch SW1 converts the data transfer rate at the port P2 into that at the port P1.

Figure 5:
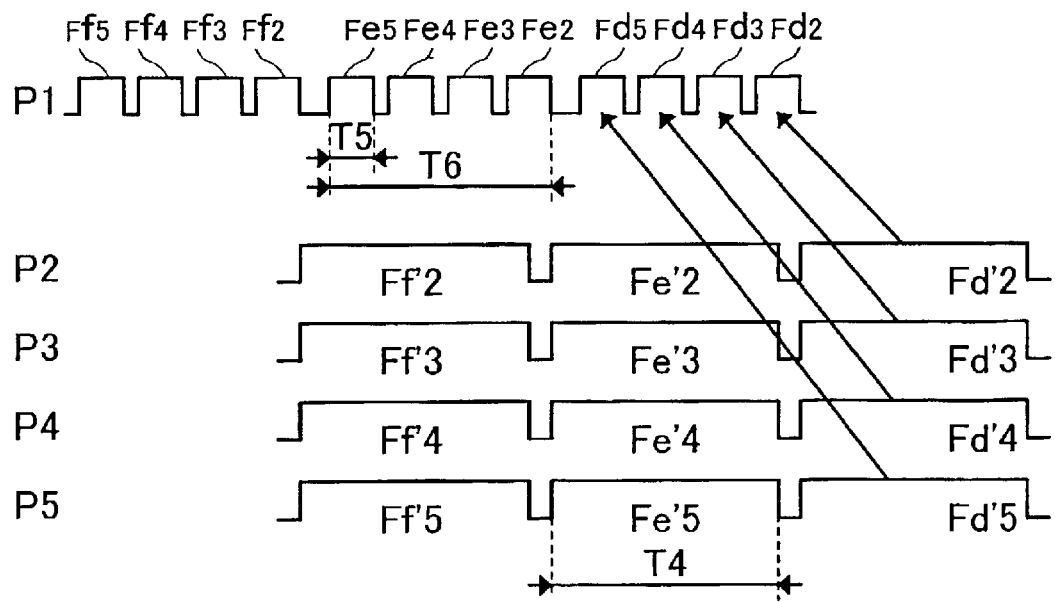
FIG. 5 is a diagram illustrating operation of the switch used in the present invention.

FIG. 5 is a diagram showing waveforms of the frame inputted to the ports P2, P3, P4 and P5 and the frame outputted from the port P1.

The high level of the waveforms represents the time that the frame is present and the low level thereof represents the time that the frame is not present.

The frame has the frame length changing in accordance with the capacity of data to be transmitted, while in this example the sequential access to the disk array is performed and the frame length is fixed.

In FIG. 5, the data transfer rate at the input port P1 is m times of that at the output ports P2, P3, P4 and P5.

Accordingly, the duration T4 for the frame Fe5 at the port P5 is contracted to the duration T5 upon outputted from the port P1.

Thus, $T4 = m \times T5$.

The duration required to output the frames Fe2, Fe3, Fe4 and Fe5 from the port P1 is assumed to be T6.

When the number of ports to be changed over by the switch is n, $T6 \cong n \times T5$ (the time having no frame is neglected).

In order to prevent reduction of the throughput due to congestion in the switch, $T6 \leq T4$ is required. $T6 \leq T4$ is the same as $n \leq m$.

In other words, the condition that the throughput is not reduced in the switch in reading of data to the disk array is to set the number n of ports to be changed over periodically to be equal to or smaller than a ratio m of the data transfer rate per channel between the disk adapter and the switch to the data transfer rate per channel between the switch and the disk array.

When this condition is satisfied, data inputted from the ports P2, P3, P4 and P5 is subjected to rate conversion in the buffer memory and changed over in frame unit periodically to thereby be multiplexed by means of the switch, so that the multiplexed data is outputted to port P1.

Accordingly, in order to increase the throughput in writing and reading operation to and from the disk array, it is understood that it is required to be set to be n≅m, that is, the number of ports to be changed over periodically is required to be set to be substantially equal to the ratio of the data transfer rate per channel between the disk adapter and the switch to the data transfer rate per channel between the switch and the disk array.

For example, a single channel of 4 Gbps is connected between the disk adapter and the switch and four channels of 1 Gbps are connected between the switch and the disk array.

Further, a single channel of 10 Gbps is connected between the disk adapter and the switch and four channels of 2 Gbps are connected between the switch and the disk array.

In this case, since the throughput is not balanced between the input and output ports of the switch, the effective throughput is 2 Gpbs×4=8 Gpbs.

With the above processing, since the rate conversion, the multiplexing and the demultiplexing are performed in the switch SW1, the data transfer rate at the channels D01, D02, D03 and D04 can be increased even if the data transfer rate at the channels D11, D12, D13 and D14 is low.

That is, the throughput between the disk adapter DKA and the disk array DA can be improved.

As the data transfer system in the disk storage system of the embodiment, the fibre channel or the InfiniBand can be used.

Figure 6:
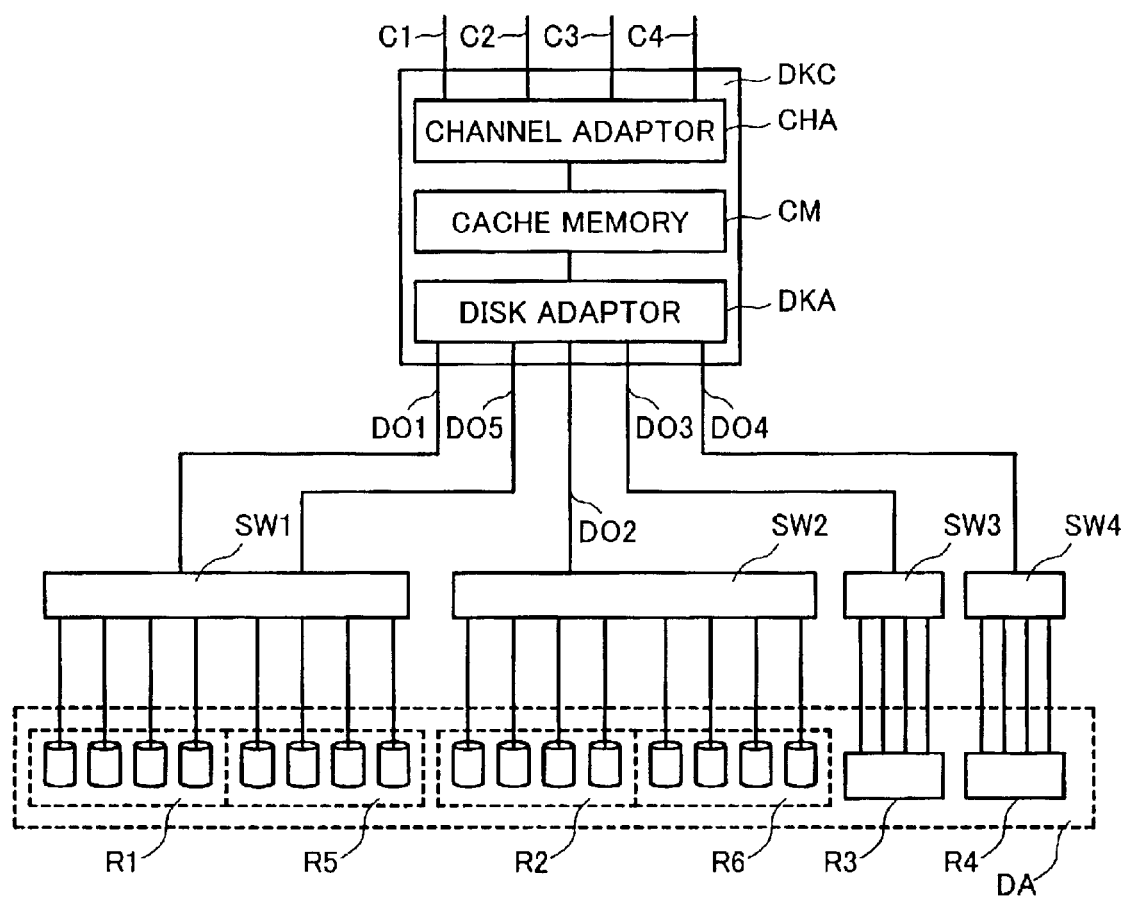
FIG. 6 is a diagram illustrating a method of increasing disk drives in the first embodiment of the present invention.

FIG. 6 is a diagram illustrating the method of increasing disk drives in the disk storage system of the first embodiment.

In FIG. 6, disk groups R5 and R6 are increased as compared with FIG. 1.

In order to increase the disk drives, switches having increased ports are used as the switches SW1 and SW2.

When the disk drives are increased, the throughput on the disk array side of the switch is increased and the balance of the throughput between the disk adapter side and the disk array side of the switch collapses. Accordingly, there is a possibility that the rate conversion function of the switch is not operated effectively.

Accordingly, in the switch SW1, a new channel D05 is increased between the disk adapter DKA and the switch SW1.

Further, in the case of the switch SW2, any new channel is not increased and the signal transmission rate of the channel D02 is increased to thereby balance the throughput between the disk adapter side and the disk array side of the switch.

For example, in the switch SW1, 8 channels of 1 Gbps are connected between the switch and the disk array and 2 channels of 4 Gbps are connected between the disk adapter and the switch.

In the switch SW2, 8 channels of 1 Gbps are connected between the switch and the disk array and 1 channel of 10 Gbps is connected between the disk adapter and the switch.

As described above, in the disk storage system of the embodiment, the disk drives can be increased in accordance with the number of ports of the switch.

This method of increasing the disk drives can be applied to increase the disk drives of the ATA (AT Attachment) system in which the number of drives capable of being connected to one port is small.

Figure 7:
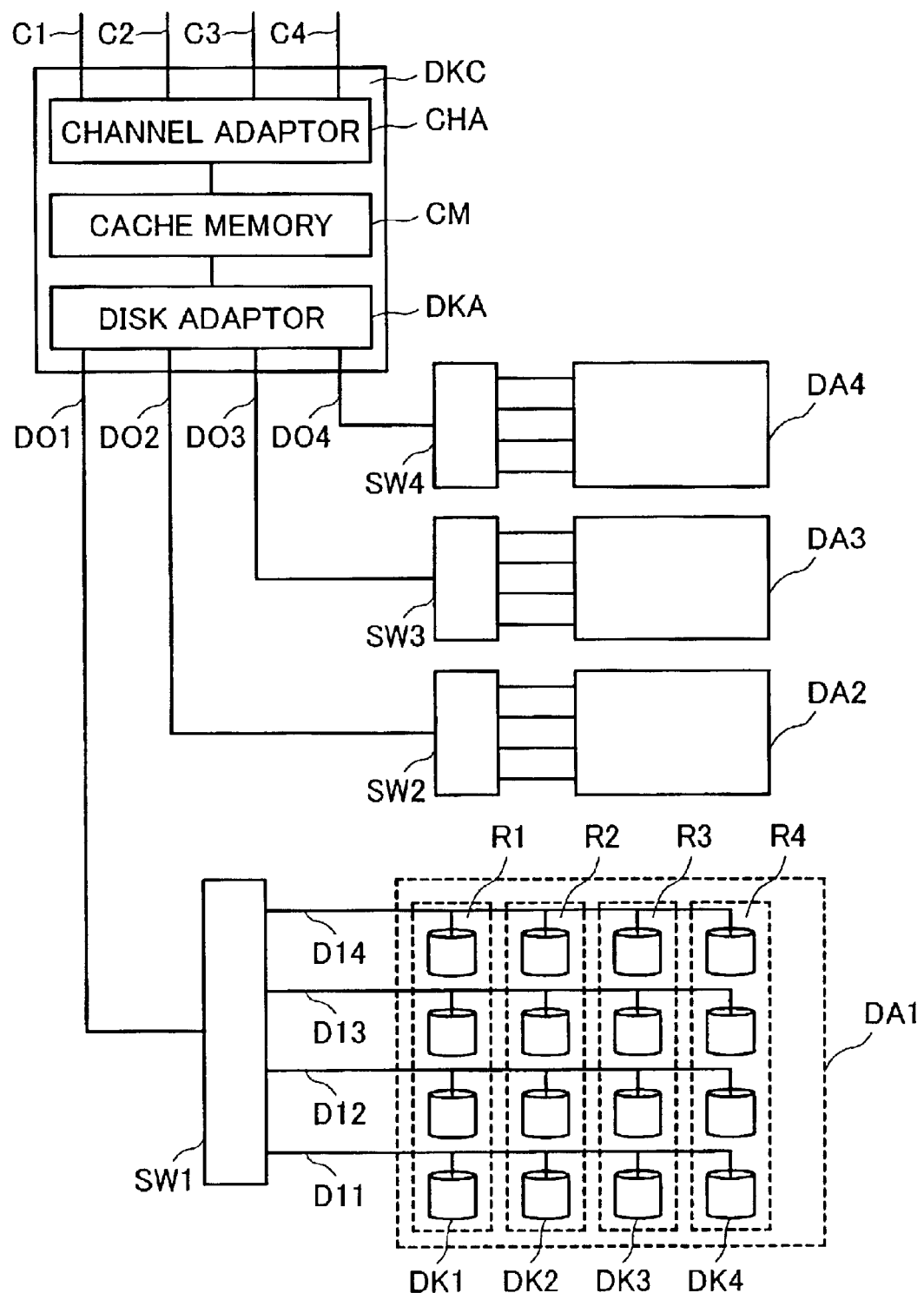
FIG. 7 schematically illustrates a disk storage system according to a second embodiment of the present invention.

FIG. 7 schematically illustrates a disk storage system according to a second embodiment of the present invention.

The disk storage system of the embodiment has the configuration of a disk array portion different from the disk storage system of the first embodiment.

The disk storage system of the embodiment includes a disk controller DKC and four disk arrays DA1, DA2, DA3 and DA4.

The disk controller DKC includes a channel adapter CHA, a cache memory CM and a disk adapter DKA.

The disk array DA1 is connected to the disk adapter DKA through a channel D01 and a switch SW1.

Similarly, the disk arrays DA2, DA3 and DA4 are connected to the disk adapter DKA through a channel D02 and a switch SW2, a channel D03 and a switch SW3, and a channel D04 and a switch SW4, respectively.

The switches SW1, SW2, SW3 and SW4 function to perform the rate conversion, the multiplexing and the demultiplexing in the same manner as the first embodiment.

The fibre channel is used as the data transfer system between the disk adapter DKA and the disk arrays DA1, DA2, DA3 and DA4 through the switches SW1, SW2, SW3 and SW4.

The switches SW1, SW2, SW3 and SW4 are fibre channel switches.

The configuration of the disk array in the embodiment is described by taking the disk array DA1 as an example.

The disk arrays DA1, DA2, DA3 and DA4 have the same drive configuration.

The disk array DA1 includes a disk array composed of four disks connected to a channel D11, a disk array composed of four disks connected to a channel D12, a disk array composed of four disks connected to the channel D13 and a disk array composed of four disks connected to a channel D14.

For example, disk drives DK1, DK2, DK3 and DK4 are connected to the channel D11.

In this manner, as the method of connecting a number of disk drives to one channel to access to a disk drive, there is a fibre channel arbitrated loop (hereinafter referred to FC-AL).

Figure 10:
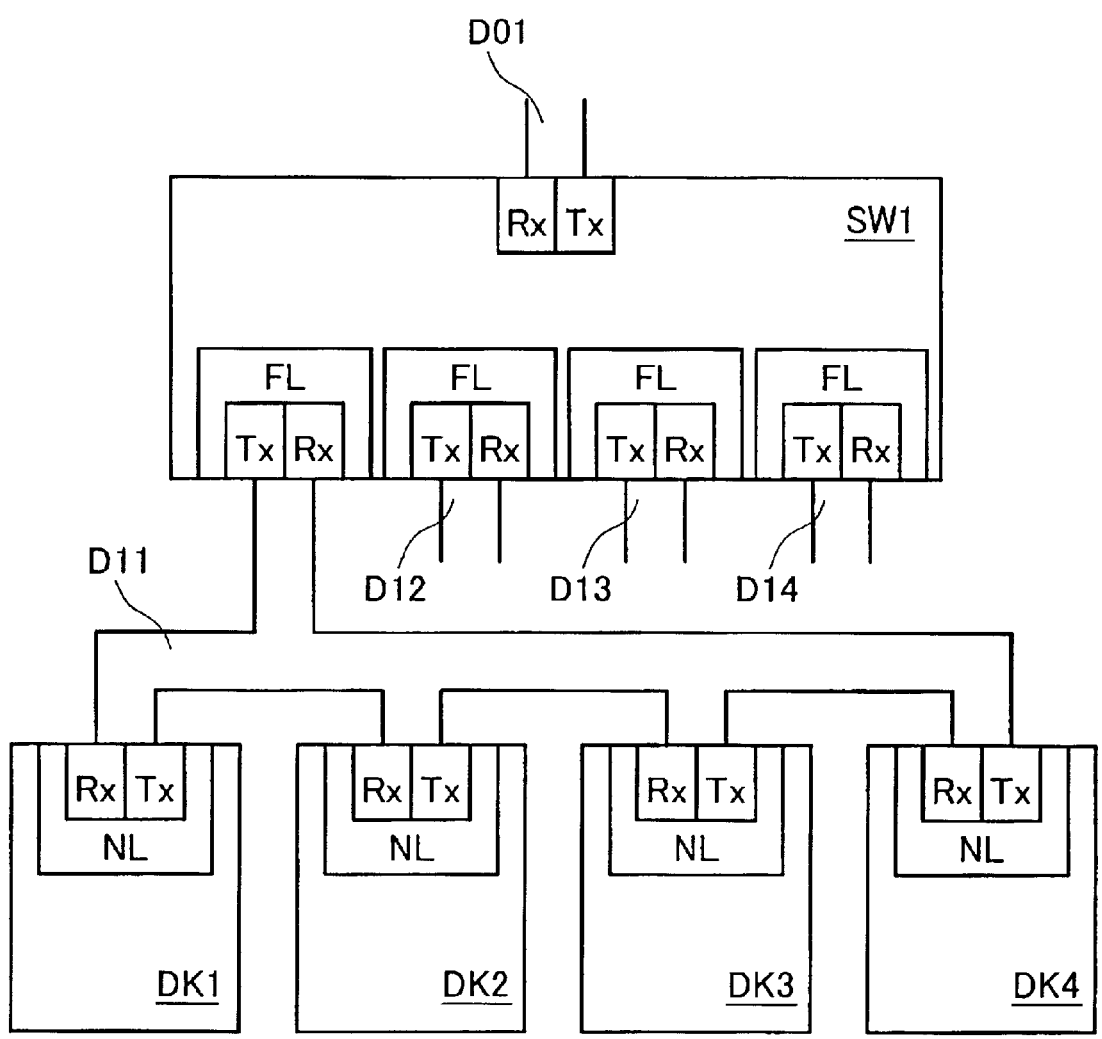
FIG. 10 is a diagram explaining a connection form by FC-AL.

FIG. 10 shows a connection form of the FC-AL by taking a connection form of the disk drives DK1, DK2, DK3 and DK4 as an example.

Each of input/output ports of the disk drivers and the switch SW1 is provided with a transmitter Tx and a receiver Rx.

The connection form of the FC-AL is the topology that the input/output ports of the drives and the switch are connected into a loop as shown in FIG. 10, for example.

The input/output ports of the drives function as NL (Node Loop) ports of the fibre channel.

The NL port is a port of the apparatus (the disk drive in the embodiment) which makes loop operation.

The input/output ports of the switch SW1 on the side connected to the disk array DA1 function as FL (Fabric Loop) ports of the fibre channel.

The FL port is a port of the switch that can connect the FC-AL.

Since the loop having the FL port functions as a public loop of the fibre channel, the FC-AL formed by the channel D11 is a public loop.

The public loop is a loop that the disk drive on the loop can communicate with a port outside of the loop through the switch.

Accordingly, the disk drives DK1, DK2, DK3 and DK4 can communicate with the disk adapter DKA through the switch SW1 and the channel D01.

As described above, the connection form of the channel D11 has been described by way example, while the channels D12, D13 and D14 are the same as the channel D11.

In the disk storage system of the embodiment, when the RAID system is constructed, the disk groups R1, R2, R3 and R4 are each the RAID group. In the embodiment, four disk drives constitute the RAID group, although the number of drives constituting the RAID group is not limited to four.

In the embodiment, the FC-AL is used in the channels D11, D12, D13 and D14 to connect the disk drives.

Up to 126 disk drives can be connected to each of the channels D11, D12, D13 and D14 in accordance with specification of the FC-AL.

Further, optical fiber cable is used as a medium of the channels D01, D02, D03 and D04 and metal cable is used as a medium of the channels D11, D12, D13 and D14.

As described above, in the disk storage system of the embodiment, since the disk drives are connected by means of the FC-AL, the number of connectable drives per port of the switch can be increased.

In other words, there is the effect that the memory capacity of the disk storage system is increased.

Further, by connecting the disk drives by means of metal cable, it is not necessary to provide any expensive optical interface in each disk drive and accordingly the cost of the disk drive can be reduced.

Figure 8:
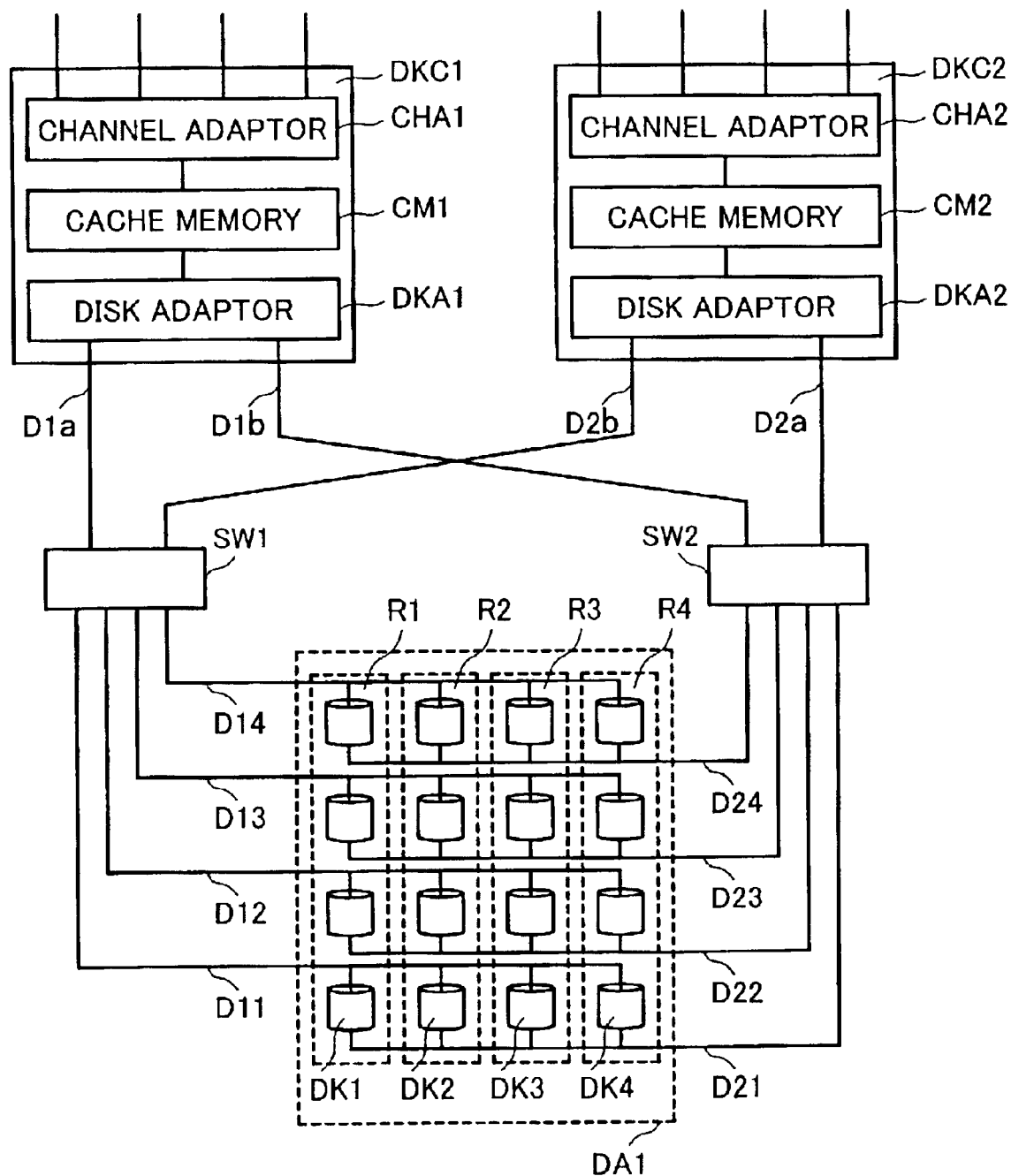
FIG. 8 schematically illustrates a disk storage system according to a third embodiment of the present invention.

FIG. 8 schematically illustrates a disk storage system according to a third embodiment of the present invention.

In the disk storage system of the embodiment, disk controllers and switches are duplicated.

In the embodiment, the fibre channel is used as the data transfer system between disk adapters DKA1, DKA2 and disk array DA1 through switches SW1, SW2.

The disk storage system of the embodiment includes disk controllers DKC1, DKC2, switches SW1, SW2 and disk array DA1.

The switches SW1 and SW2 function to perform the rate conversion, the multiplexing and the demultiplexing in the same manner as the first embodiment.

The disk controller DKC1 includes channel adapter CHA1, cache memory CM1 and disk adapter DKA1.

The disk controller DKC2 includes channel adapter CHA2, cache memory CM2 and disk adapter DKA2.

The disk adapter DKA1 is connected to the switch SW1 through channel D1a, the disk adapter DKA2 is connected to the switch SW2 through channel D2a, the disk adapter DKA1 is connected to the switch SW2 through channel D1b and the disk adapter DKA2 is connected to the switch SW1 through channel D2b.

The disk drives constituting the disk array DA1 each include two input/output ports.

For example, the disk drives DK1, DK2, DK3 and DK4 are connected to both channels D11 and D21.

The disk array DA1 includes a disk array composed of four disk drives connected to channels D11 and D21, a disk array composed of four disk drives connected to channels D12 and D22, a disk array composed of four disk drives connected to channels D13 and D23 and a disk array composed of four disk drives connected to channels D14 and D24.

The channels D11, D12, D13, D14, D21, D22, D23 and D24 are connected to the disk drives by the FC-AL.

Figure 11:
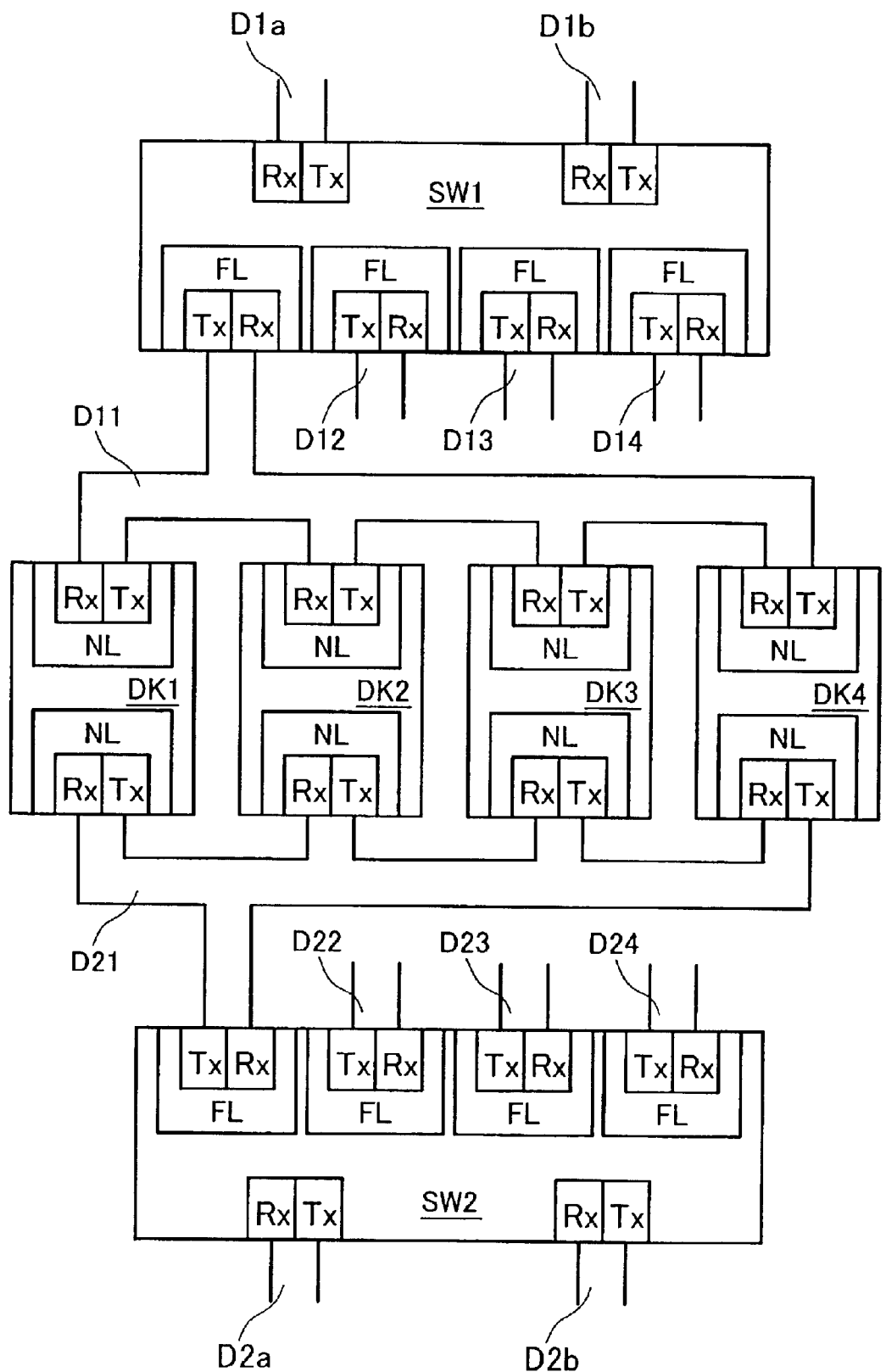
FIG. 11 is a diagram explaining a connection form by FC-AL.

FIG. 11 shows a connection form of the FC-AL in the embodiment by taking a connection form of the disk drives DK1, DK2, DK3 and DK4 as an example.

Each of the disk drives includes two NL ports.

A transmitter Tx and a receiver Rx are provided with each of input/output ports of the disk drives and the switches SW1 and SW2.

The input/output ports of the switches SW1 and SW2 on the side connected to the disk array DA1 are FL ports.

The switch SW1 and the disk drives DK1, DK2, DK3 and DK4 are connected into a loop by means of the channel D11.

Similarly, the switch SW2 and the disk drives DK1, DK2, DK3 and DK4 are connected into a loop by means of the channel D21.

The two loops are public loops of the fibre channel and the disk drives DK1, DK2, DK3 and DK4 can communicate with the disk adapter DKA1 or DKA2 through the switch SW1 or SW2.

The connection form of the channels D11 and D21 has been described as above by way of example, while the channels D12, D13, D14, D22, D23 and D24 have also the same connection form.

In the disk storage system of the embodiment, when the RAID system is constructed, the disk groups R1, R2, R3 and R4 are each the RAID group. In the embodiment, four disk drives constitute the RAID group, although the number of drives constituting the RAID group is not limited to four.

Any of the disk adapters DKA1 and DKA2 can access to all of the disk drives in the disk array DA1.

The disk storage system of the embodiment uses the channel D1b or D2b as a detour upon failure of the switch SW1 or SW2.

For example, even when the switch SW1 fails, the disk adapter DKA1 can access to the disk array DA1 through the channel D1b and the switch SW2.

On the other hand, when the switch SW2 fails, the disk adapter DKA2 can access to the disk array DA1 through the channel D2b and the switch SW1 and accordingly the disk storage system having high reliability can be realized.

Figure 12:
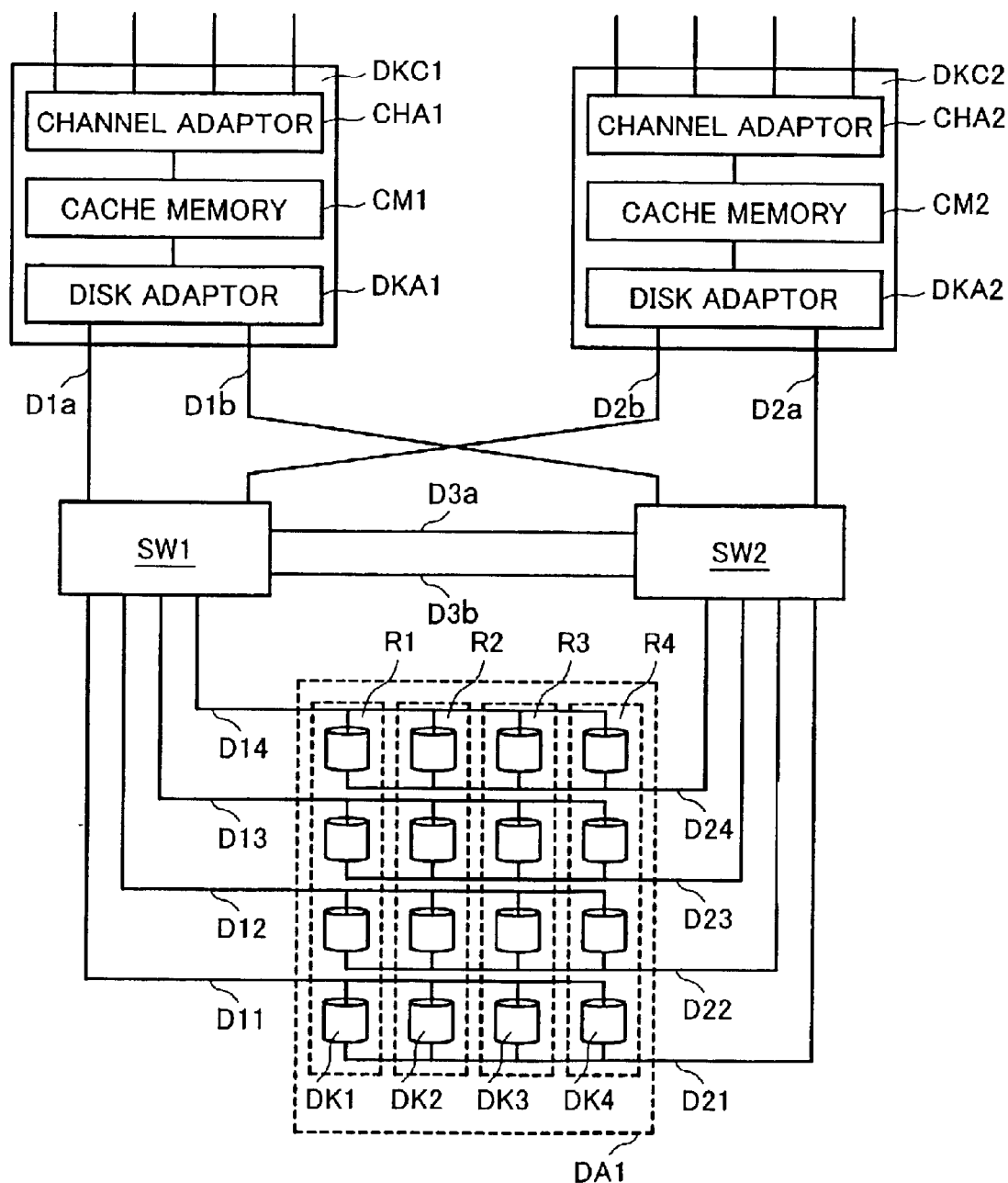
FIG. 12 schematically illustrates a disk storage system according to a fourth embodiment of the present invention.

FIG. 12 schematically illustrates a disk storage system according to a fourth embodiment of the present invention.

In the disk storage system of the embodiment, channels D3a and D3b connecting between the switches SW1 and SW2 are provided in the disk storage system of the third embodiment.

In the embodiment, the fibre channel is used as the data transfer system between the disk adapters DKA1, DKA2 and the disk array DA1 through the switches SW1, SW2.

The disk storage system of the embodiment includes disk controllers DKC1, DKC2, switches SW1, SW2 and disk array DA1.

The switches SW1 and SW2 function to perform the rate conversion, the multiplexing and the demultiplexing in the same manner as the first embodiment.

The disk controller DKC1 includes channel adapter CHA1, cache memory CM1 and disk adapter DKA1.

The disk controller DKC2 includes channel adapter CHA2, cache memory CM2 and disk adapter DKA2.

The disk adapter DKA1 is connected to the switch SW1 through channel D1a, the disk adapter DKA2 is connected to the switch SW2 through channel D2a, the disk adapter DKA1 is connected to the switch SW2 through channel D1b and the disk adapter DKA2 is connected to the switch SW1 through channel D2b.

Further, the switches SW1 and SW2 are connected to each other through channels D3a and D3b.

Disk drives constituting the disk array DA1 each include two input/output ports.

For example, the disk drives DK1, DK2, DK3 and DK4 are connected to both channels D11 and D21.

The disk array DA1 includes a disk array composed of four disk drives connected to channels D11 and D21, a disk array composed of four disk drives connected to channels D12 and D22, a disk array composed of four disk drives connected to channels D13 and D23 and a disk array composed of four disk drives connected to channels D14 and D24.

The channels D11, D12, D13, D14, D21, D22, D23 and D24 are connected to the disk drives by the FC-AL as shown in FIG. 11.

Any of the disk adapters DKA1 and DKA2 can access to all of the disk drives in the disk array DA1.

In the disk storage system of the embodiment, when the RAID system is constructed, the disk groups R1, R2, R3 and R4 are each the RAID groups. In the embodiment, four disk drives constitute the RAID group, although the number of drives constituting the RAID group is not limited to four.

The access route between the disk adapters DKA1, DKA2 and the disk array DA1 at the normal state (in case of no failure in switch) is now described.

The disk adapter DKA1 includes a route (route 1) for accessing to the disk array DA1 through the channel D1a and the switch SW1 and a route (route 2) for accessing to the disk array DA1 through the channel D1b, the switch SW2, the channel D3a and the switch SW1.

Similarly, the disk adapter DKA2 includes a route (route 3) for accessing to the disk array DA1 through the channel D2a and the switch SW and a route (route 4) for accessing to the disk array DA1 through the channel D2b, the switch SW1, the channel D3b and the switch SW2.

On the other hand, the channels D1b and D2b are used as detours upon failure of the switch.

For example, even when the switch SW1 fails, the disk adapter DKA1 can access to the disk array DA1 through the channel D1b and switch SW2.

On the other hand, when the switch SW2 fails, the disk adapter DKA2 can access to the disk array DA1 through the channel D2b and the switch SW1.

The throughput between the disk adapter and the disk array in the embodiment is now described.

As an example, it is assumed that the data transfer rate on the channels D1a, D1b, D2a, D2b, D3a and D3b is 2 Gbps per channel and the data transfer rate on the channels D11, D12, D13, D14, D21, D22, D23 and D24 is 1 Gbps per channel.

At this time, the total throughput between the switch SW1 and the disk array DA1 is 4 Gbps.

The total throughput between the disk adapter DKA1 and the switch SW1 is 4 Gbps by using the routes 1 and 2 as the access route.

Since the throughputs of the switch SW1 on the side of disk adapter DKA1 and on the side of disk array DA1 are both 4 Gbps, the throughput between the disk adapter DKA1 and the disk array DA1 is 4 Gbps.

Similarly, the total throughput between the switch SW2 and the disk array DA1 is 4 Gbps.

The total throughput between the disk adapter DKA2 and the switch SW2 is 4 Gbps by using the routes 3 and 4 as the access route.

Since the throughputs of the switch SW2 on the side of disk adapter DKA2 and on the side of disk array DA1 are both 4 Gbps, the throughput between the disk adapter DKA2 and the disk array DA1 is 4 Gbps.

When the throughput per channel as described above is applied to the third embodiment (FIG. 8), the throughput between the disk adapter DKA1 and the disk array DA1 is limited to the throughput on the channel D1a and is 2 Gbps since the channels D1b and D2b are used as detours only upon failure of the switch.

Similarly, the throughput between the disk adapter DKA2 and the disk array DA1 is limited to the throughput on the channel D2a and is 2 Gbps.

In the third embodiment, in order to increase the throughput between the disk adapter and the disk array to 4 Gbps, it is necessary to increase the data transfer rate on both the channels D1a and D2a to 4 Gbps.

As described above, according to the embodiment, even if the data transfer rate per channel between the disk adapter and the switch is low, the disk storage system having the increased total throughput between the disk adapter and the disk array can be realized.

As described above, according to the present invention, the following effects can be attained.

There can be provided the disk storage system having the high throughput between the disk adapter and the disk array.

Further, there can be provided the disk storage system having the high throughput between the disk adapter and the disk array and the increased disk drives connected in the disk array.

Moreover, there can be provided the disk storage system having the high reliable disk array.

Further, there can be provided the disk storage system having the high reliable network between the disk adapter and the disk array.

Furthermore, there can be provided the disk storage system having the network between the disk adapter and the disk array with high reliability and high throughput.

Moreover, there can be provided the disk storage system having the high throughput in reading from and writing in the disk.

Further, there can be provided the disk storage system capable of keeping the high throughput.

In addition, there can be provided the disk storage system having the high throughput between the disk adapter and the disk array and a low cost.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A disk storage system including a disk controller and a disk array, said disk controller including a channel adapter, a cache memory and a disk adapter, wherein:
   said disk adapter is connected to said disk array through switches having buffer memories;
   a data transfer rate per channel between said disk adapter and said switches is set to be higher than that between said switches and said disk array: and
   said switches change over connection between ports to which said disk adapter is connected and ports to which disk drives constituting said disk array are connected in accordance with destination information in a frame for each of inputted frames.

2. A disk storage system according to claim 1, wherein:
   data transferred from said disk array to said switch is multiplexed in said switch to be transferred to said disk adapter when data is read out from said disk array; and
   data transferred from said disk adapter to said switch is demultiplexed in said switch to be transferred to said disk array when data is written into said disk array.

3. A disk storage system according to claim 1, wherein:
   said disk adapter sets destination information into a frame to be transmitted so that changing over of connection between said ports is made periodically when data is written into said disk array from said disk adapter; and
   said switch changes over connection between said ports in accordance with a round robin method when data is read out from said disk array to said disk adapter.

4. A disk storage system according to claim 1, wherein:
   said disk adapter is connected to said switch through optical fiber cable and said switch is connected to said disk array through metal cable.

5. A disk storage system including a disk controller and a plurality of disk arrays, said disk controller including a channel adapter, a cache memory and a disk adapter, wherein:
   said disk arrays comprise a plurality of disk drives connected into a loop; and
   said disk adapter is connected to said plurality of disk arrays through switches having buffer memories;
   a data transfer rate per channel between said disk adapter and said switches is set to be higher than that between said switches and said plurality of disk arrays;
   said switches change over connection between ports to which said disk adapter is connected and ports to which said plurality of disk arrays are connected in accordance with destination information in a frame for each of inputted frames.

6. A disk storage system according to claim 5, wherein:
   data transferred from said disk array to said switch is multiplexed in said switch to be transferred to said disk adapter when data is read out from said disk array; and
   data transferred from said disk adapter to said switch is demultiplexed in said switch to be transferred to said disk array when data is written into said disk array.

7. A disk storage system according to claim 5, wherein:
   said disk adapter sets destination information into a frame to be transmitted so that changing over of connection between said ports is made periodically when data is written into said disk array from said disk adapter; and
   said switch changes over connection between said ports in accordance with a round robin method when data is read out from said disk array to said disk adapter.

8. A disk storage system according to claim 5, wherein:
   said disk adapter is connected to said switch through optical fiber cable and said switch is connected to said disk array through metal cable.

9. A disk storage system including a disk controller and a disk array, said disk controller including a channel adapter, a cache memory and a disk adapter, wherein:
   said disk adapter is connected to said disk array through switches having buffer memories; and
   a combination of disk drives connected to the same switch constitutes a RAID group;
   a data transfer rate per channel between said disk adapter and said switches is set to be higher than that between said switches and said disk array;
   said switches change over connection between ports to which said disk adapter is connected and ports to which said disk drives constituting said RAID group are connected in accordance with destination information in a frame for each of inputted frames.

10. A disk storage system according to claim 9, wherein:
    data transferred from said disk array to said switch is multiplexed in said switch to be transferred to said disk adapter when data is read out from said disk array; and
    data transferred from said disk adapter to said switch is demultiplexed in said switch to be transferred to said disk array when data is written into said disk array.

11. A disk storage system according to claim 9, wherein:
    said disk adapter sets destination information into a frame to be transmitted so that changing over of connection between said ports is made periodically when data is written into said disk array from said disk adapter; and
    said switch changes over connection between said ports in accordance with a round robin method when data is read out from said disk array to said disk adapter.

12. A disk storage system according to claim 9, wherein:
    said disk adapter is connected to said switch through optical fiber cable and said switch is connected to said disk array through metal cable.

13. A disk storage system including first and second disk controllers and a plurality of disk arrays;
    said first disk controller including a first channel adapter, a first cache memory and a first disk adapter; and
    said second disk controller including a second channel adapter, a second cache memory and a second disk adapter;
    wherein:
    said first disk adapter is connected to said plurality of disk arrays through a first switch having a buffer memory and said second disk adapter is connected to said plurality of disk arrays through a second switch having a buffer memory, said first switch being connected to said second disk adapter, said second switch being connected to said first disk adapter;
    a data transfer rate per channel between said first disk adapter and said first switch and between said second disk adapter and said first switch is set to be higher than that between said first switch and said plurality of disk arrays;
    a data transfer rate per channel between said second disk adapter and said second switch and between said first disk adapter and said second switch is set to be higher than that between said second switch and said plurality of disk arrays;
    said first switch changing over connection between ports to which said first or second disk adapter is connected and ports to which said plurality of disk arrays are connected in accordance with destination information in a frame for each of inputted frames;

said second switch changing over connection between ports to which said first or second disk adapter is connected and ports to which said plurality of disk arrays are connected in accordance with destination information in a frame for each of inputted frames.

14. A disk storage system according to claim 13, wherein:

data transferred from said disk array to said switch is multiplexed in said switch to be transferred to said disk adapter when data is read out from said disk array; and data transferred from said disk adapter to said switch is demultiplexed in said switch to be transferred to said disk array when data is written into said disk array.

15. A disk storage system according to claim 13, wherein:

said disk adapter sets destination information into a frame to be transmitted so that changing over of connection between said ports is made periodically when data is written into said disk array from said disk adapter; and said switch changes over connection between said ports in accordance with a round robin method when data is read out from said disk array to said disk adapter.

16. A disk storage system according to claim 13, wherein:

said disk adapter is connected to said switch through optical fiber cable and said switch is connected to said disk array through metal cable.

17. A disk storage system including first and second disk controllers and a plurality of disk arrays;

said first disk controller including a first channel adapter, a first cache memory and a first disk adapter;

said second disk controller including a second channel adapter, a second cache memory and a second disk adapter;

wherein:

said first disk adapter is connected to said plurality of disk arrays through a first switch having a buffer memory and said second disk adapter is connected to said plurality of disk arrays through a second switch having a buffer memory, said first switch being connected to said second disk adapter, said second switch being connected to said first disk adapter;

a data transfer rate per channel between said first disk adapter and said first switch and between said second disk adapter and said first switch is set to be higher than that between said first switch and said plurality of disk arrays;

a data transfer rate per channel between said second disk adapter and said second switch and between said first disk adapter and said second switch is set to be higher than that between said second switch and said plurality of disk arrays;

said first switch being connected to said second switch through a channel having the same data transfer rate as that connected between said first disk adapter and said second switch and a channel having the same data transfer rate as that connected between said second disk adapter and said first switch;

said first switch changing over connection between ports to which said first or second disk adapter or said second switch is connected and ports to which said plurality of disk arrays are connected in accordance with destination information in a frame for each of inputted frames;

said second switch changing over connection between ports to which said first or second disk adapter or said first switch is connected and ports to which said plurality of disk arrays are connected in accordance with destination information in a frame for each of inputted frames.

18. A disk storage system according to claim 17, wherein:

data transferred from said disk array to said switch is multiplexed in said switch to be transferred to said disk adapter when data is read out from said disk array; and data transferred from said disk adapter to said switch is demultiplexed in said switch to be transferred to said disk array when data is written into said disk array.

19. A disk storage system according to claim 17, wherein:

said disk adapter sets destination information into a frame to be transmitted so that changing over of connection between said ports is made periodically when data is written into said disk array from said disk adapter; and said switch changes over connection between said ports in accordance with a round robin method when data is read out from said disk array to said disk adapter.

20. A disk storage system according to claim 17, wherein:

said disk adapter is connected to said switch through optical fiber cable and said switch is connected to said disk array through metal cable.

21. A disk storage system according to claim 19, wherein:

the number of ports to be changed over periodically is set to be substantially equal to a ratio of a data transfer rate per channel between said disk adapter and said switch to that between said switch and said disk array.

* * * * *